(12) United States Patent
Janarthanam et al.

(10) Patent No.: US 8,413,517 B2
(45) Date of Patent: Apr. 9, 2013

(54) FUEL CELL SYSTEM AND HEATED PRESSURE SENSOR

(75) Inventors: Suriyaprakash Ayyangar Janarthanam, Westland, MI (US); William F. Sanderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 12/721,179

(22) Filed: Mar. 10, 2010

(65) Prior Publication Data

US 2011/0165488 A1 Jul. 7, 2011

(51) Int. Cl.
*G01L 19/04* (2006.01)
(52) U.S. Cl. .................... 73/708; 73/114.01; 73/118.01
(58) Field of Classification Search ............... None
See application file for complete search history.

(56) References Cited

U.S. PATENT DOCUMENTS

| | | | |
|---|---|---|---|
| 4,561,402 A * | 12/1985 | Nakano et al. ............. | 73/23.32 |
| 6,458,477 B1 * | 10/2002 | Hsu .......................... | 429/440 |
| 6,475,651 B1 * | 11/2002 | Wilkinson et al. ........ | 429/431 |
| 6,638,650 B1 * | 10/2003 | Bailey et al. .............. | 429/432 |
| 7,258,015 B1 * | 8/2007 | Shaw et al. ................ | 73/708 |
| 7,313,949 B2 * | 1/2008 | Yorita et al. .............. | 73/114.07 |
| 7,318,846 B2 * | 1/2008 | Boltze et al. .............. | 48/61 |
| 7,373,819 B2 * | 5/2008 | Engler et al. .............. | 73/335.03 |
| 7,416,649 B2 * | 8/2008 | Ieda et al. ................. | 204/401 |
| 7,416,651 B2 | 8/2008 | Ishikawa et al. | |
| 7,488,547 B1 * | 2/2009 | Iacovelli ................... | 429/434 |
| 7,581,520 B2 * | 9/2009 | Kern et al. ................ | 123/145 A |
| 7,624,620 B2 * | 12/2009 | Hirose et al. ............. | 73/35.12 |
| 7,647,178 B2 | 1/2010 | Ekmark et al. | |
| 7,730,766 B2 * | 6/2010 | Ryser et al. .............. | 73/30.04 |
| 7,954,382 B2 * | 6/2011 | Kern et al. ................ | 73/715 |
| 2003/0146093 A1 | 8/2003 | Akiyama et al. | |
| 2006/0134480 A1 | 6/2006 | Beasley et al. | |
| 2008/0185297 A1 | 8/2008 | Chow et al. | |

FOREIGN PATENT DOCUMENTS

| | | |
|---|---|---|
| JP | 2005164538 A | 6/2005 |
| JP | 2005166600 A | 6/2005 |
| JP | 2005317264 A | 11/2005 |
| JP | 2005353454 A * | 12/2005 |
| JP | 2007173170 A | 7/2007 |

OTHER PUBLICATIONS

Sensor Business, Marketing and Technology Developments: NGK Helps Drive Automotive Exhaust Gas Sensing, Sensor Business Digest, Oct. 1, 2004.

* cited by examiner

*Primary Examiner* — Lisa Caputo
*Assistant Examiner* — Jermaine Jenkins
(74) *Attorney, Agent, or Firm* — Damian Porcari; Brooks Kushman P.C.

(57) ABSTRACT

A fuel cell system may include a fuel cell stack, a manifold in fluid communication with the stack, and a pressure sensor. The pressure sensor may include a housing defining a chamber in fluid communication with the manifold, a pressure sensing element disposed within the chamber, and a heating element disposed within the chamber.

17 Claims, 4 Drawing Sheets

FUEL CELL SYSTEM AND HEATED PRESSURE SENSOR

BACKGROUND

In a typical Proton Electrode Membrane (PEM) type fuel cell system, humidified gases are used in both the cathode (air) and anode (hydrogen) for power generation. Water is a by product of the chemical reaction. These humidified gases and the generated water may present issues during fuel cell system start at freezing temperatures. For example, pressure sensors, whose functionality may be needed to operate the fuel cell stack with balanced pressure on either side of the stack membrane, may become frozen. Imbalances in anode-cathode pressure may result in membrane malfunction. Hence, automatic fuel cell system shut-off controls may be activated when abnormal pressure readings are observed.

SUMMARY

A pressure sensor for a fuel cell system may include a heater to melt ice within the sensor. As an example, a fuel cell system may be configured to provide motive power for a vehicle. The fuel cell system may include a pressure sensor configured to detect a pressure associated with the fuel cell system and include an internal heating element.

Numbered elements of the Figures that differ by multiples of 100 may have similar, although not necessarily identical, descriptions. As an example, elements 46, 146, 246, etc. may share similar descriptions.

DETAILED DESCRIPTION

Figure 1:
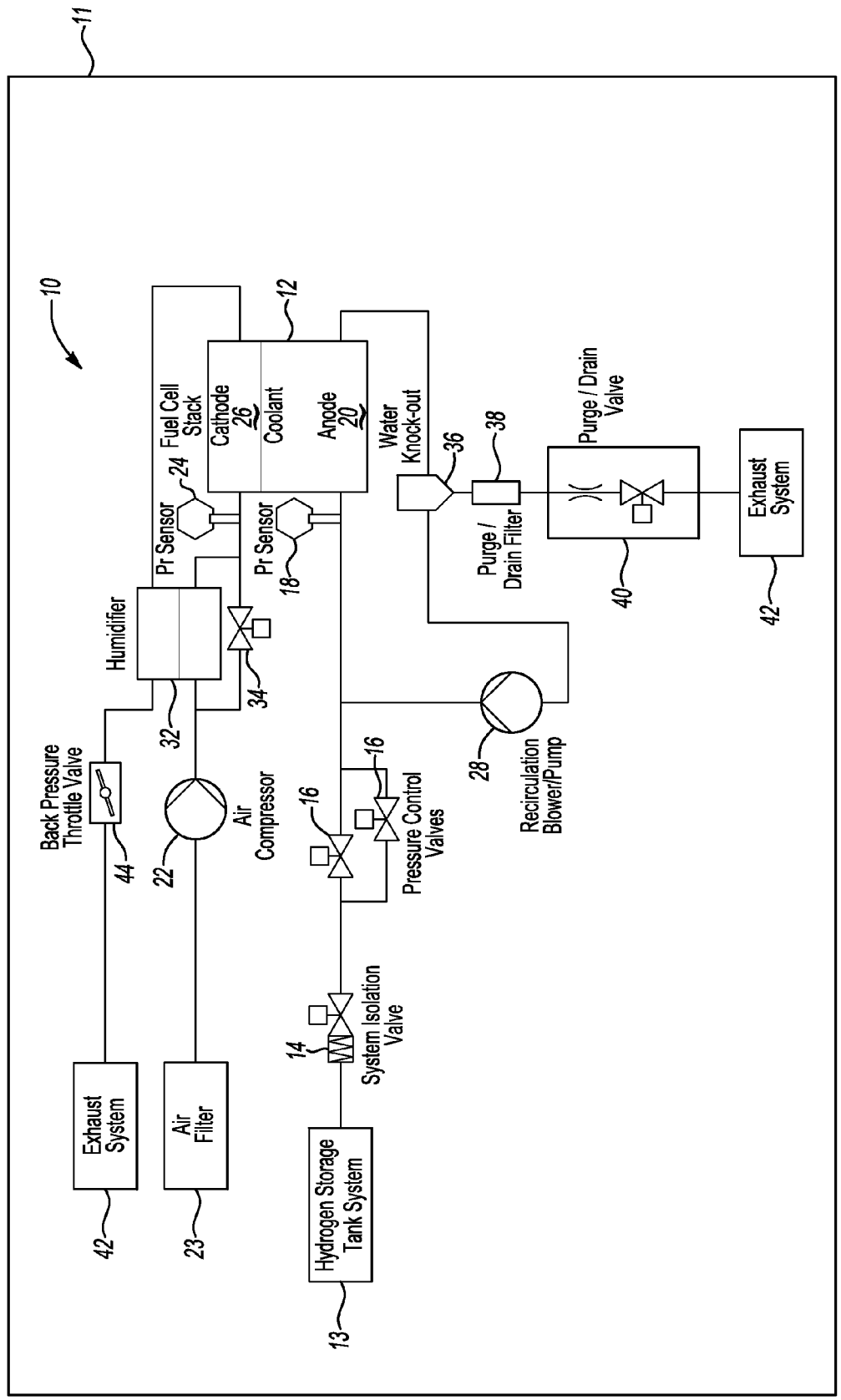
FIG. 1 is a schematic diagram of an example fuel cell system for an automotive vehicle.

Referring to FIG. 1, in an example PEM based fuel cell system 10, an anode subsystem may provide the necessary hydrogen fuel at correct pressure, flow and humidity to a fuel cell stack 12. Likewise, a cathode subsystem may provide the necessary oxygen (air) at correct pressure, flow and humidity to the stack 12.

As known in the art, electrical energy may be generated by the fuel cell stack 12 as the hydrogen and oxygen react. This electrical energy may be used to power various electrical devices and/or stored within an energy storage unit.

The fuel cell stack 12 of FIG. 1, for example, is configured to provide motive power for a vehicle 11. That is, the stack 12 is electrically connected in a known fashion with an electric machine (not shown) that converts electrical energy generated by the stack 12 to mechanical energy used to move the vehicle 11. Alternatively, the stack 12 may be electrically connected with a battery (not shown) as mentioned above to store electrical energy generated by the stack 12. An electric machine may be configured in a known fashion to draw electrical energy from the battery to produce mechanical energy used to move the vehicle 11. Other arrangements are, of course, also possible.

Fuel supply from a hydrogen storage tank system 13 is enabled through a system isolation valve 14, and the supply pressure to the fuel cell stack 12 is regulated by a pressure control device 16. This pressure control device 16 takes input from a pressure sensor 18 at the inlet of the fuel cell stack's anode 20 to regulate the hydrogen fuel pressure to the stack 12.

An air compressor 22 increases the ambient pressure of air filtered by air filter 23 based on input from an air pressure sensor 24 at the inlet of the fuel cell stack's cathode 26.

Controls are established in such a way that the pressure on either side of the fuel cell membrane (not shown) is maintained within a certain tolerance, for example around 600 mbar, which may vary depending upon the fuel cell stack design. Any overpressure or under pressure may result in system shut down to protect the fuel cell stack membrane from malfunction.

For effective power generation, the PEM type fuel cell stack 12 may require humidified gases. Anode gas humidity may be maintained by recirculating the anode gas mixture from the fuel cell stack's outlet using a blower 28 to mix feed gas from the hydrogen storage tank system 13 with the recirculated hydrogen. Cathode gas (air) humidity is maintained by passing air through a humidifier 32. The humidifier 32 may be by-passed via valve 34.

At the anode side of the fuel cell stack's outlet, a water knock-out 36, purge/drain filter 38, and purge/drain valve 40 are provided to remove water from the anode outlet. This removed water is passed to an exhaust system 42 of the vehicle 11. At the cathode side of the fuel cell stack's outlet, a back pressure throttle valve 44 fluidly connects the humidifier 32 and the exhaust system 42.

The humidified gases along with the generated water, which is a by product of the chemical process during power generation, may present issues during fuel cell system start at or below freezing temperatures. The water from the humidified gases may condense during soak, a period between system shutdown and restart, and can freeze if ambient temperatures dictate. Ice formation on membrane's of the pressure sensors 18, 24 may lead to either no signal or improper signal output when the sensors 18, 24 are powered-up.

To address issues of icing on the membranes of the sensors 18, 24, heater rings containing one or two Positive Thermal Coefficient (PTC) heater(s) may be mounted external to the sensor ports. Testing of this arrangement, however, has revealed that relatively long heating periods, 180 seconds for example, are required to thaw any ice formation inside the sensor ports or elements. Within such a timeframe, other controls may initiate shut down of the system.

Figure 2:
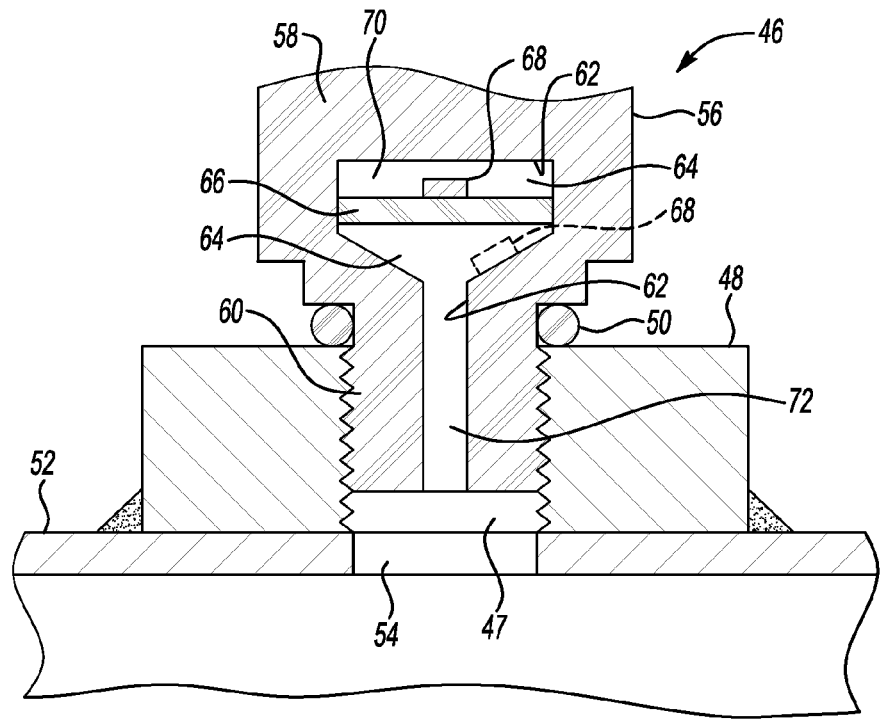
FIG. 2 is a side view, in cross-section, of an embodiment of a pressure sensor.

Referring to FIG. 2, an embodiment of a pressure sensor 46 may be engaged with a threaded fluid passageway 47 of a sensor port 48. An O-ring 50 may be used to assist in properly fitting the pressure sensor 46 to the sensor port 48. The sensor port 48, in this example, is welded to a manifold 52. Any suitable attachment method, however, may be used.

The manifold 52 includes an opening 54. The threaded fluid passageway 47 and opening 54 are generally aligned so as to provide fluid access to the manifold 52 from the sensor port 48. The manifold 52, in this example, may fluidly connect the pressure control valves 16 and the fuel cell stack's anode 20 of FIG. 1. The manifold 52 may instead, for example, fluidly connect the humidifier 32 and the stack's cathode 26 of FIG. 1. Other arrangements are also possible.

The pressure sensor 46 includes a housing 56 having a cap portion 58 and a threaded portion 60. The threaded portion 60 engages threads of the threaded fluid passageway 47 of the sensor port 48. The housing 56 also includes an internal surface 62 that defines a chamber 64 within the housing 56. This chamber 64 extends from the cap portion 58 and through the threaded portion 60 such that the chamber 64 is in fluid communication with the manifold 52 via the sensor port 48.

In the embodiment of FIG. 2, the housing 56 is made from a thermally insulative material such as plastic. For example, a polyphenol sulfide (PPS) or a polyamide (PA) may be used in circumstances where the manifold 52 is configured to transport hydrogen gas. In other embodiments, the housing 56 may be made from a metal and the internal surface 62 coated with a thermally insulative layer. The housing 56, however, may be made from any suitable material.

A sensing element 66 (e.g., membrane) is supported within the chamber 64 and divides the chamber 64 into a reference chamber 70 and sense chamber 72. The sensing element 66 is configured in a known/suitable fashion to detect the pressure within the manifold 52. A heating element 68 (e.g., PTC, etc.) is in contact with the sensing element 66. Of course, the heating element 68 may be located elsewhere within the reference chamber 70 or the sense chamber 72. For example, the heating element 68 may be supported by the internal surface 62 within the sense chamber 72 (as shown in phantom line) and spaced away from the sensing element 66.

Because of its proximity to the sensing element 66, the heating element 68 may rapidly melt any ice on the sensing element 66. Additionally, heat generated by the heating element 68 may be confined within the chamber 64 because of the thermally insulative properties of the housing 56.

One of ordinary skill will recognize that any known/suitable electrical connections may be used to electrically connect the sensing element 66 and heating element 68 with appropriate control infrastructure (e.g., controllers, etc.) Such electrical connections are not illustrated so as to not unnecessarily crowd the Figures.

Figure 3:
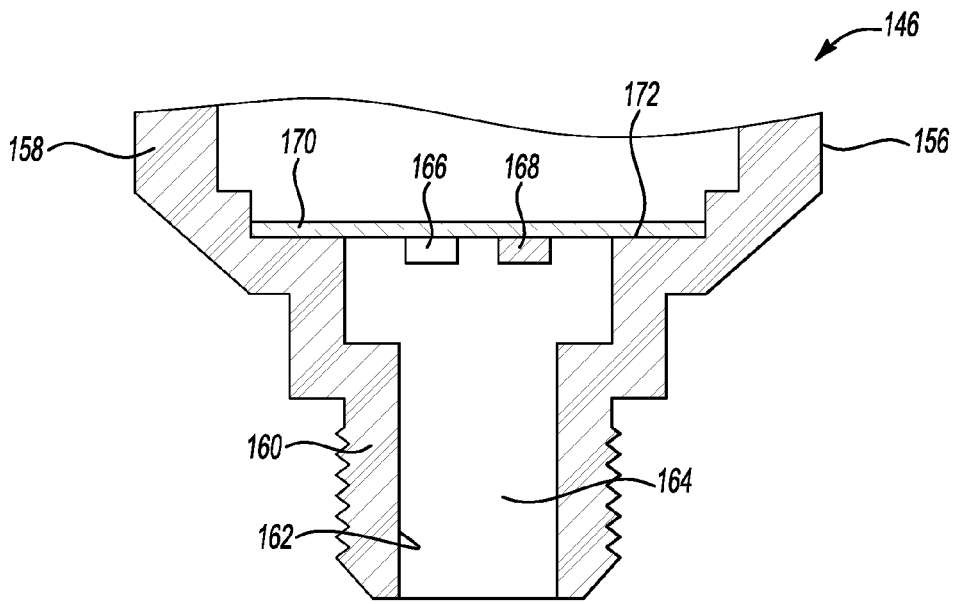
FIG. 3 is a side view, in cross-section, of another embodiment of a pressure sensor.

Referring to FIG. 3, another embodiment of a pressure sensor 146 includes a printed circuit board 170 supported on a support surface 172 within the cap portion 158 of the pressure sensor 146. The pressure sensing element 166 (e.g., a MEMS-based sensing element, etc.) and the heating element 168, in this embodiment, are mounted to the printed circuit board 170. The heating element 168, however, may be mounted in any suitable location within the chamber 164. Again, the proximity of the heating element 168 to the pressure sensing element 166 may permit the heating element to rapidly melt any ice on the sensing element 166.

Other sensors and/or logic elements may also be mounted to and/or integrated with the printed circuit board 170. For example, a temperature sensor (not shown) may be mounted to the printed circuit board 170 to provide information regarding when the heating element 168 should be activated and deactivated, etc.

Figure 4:
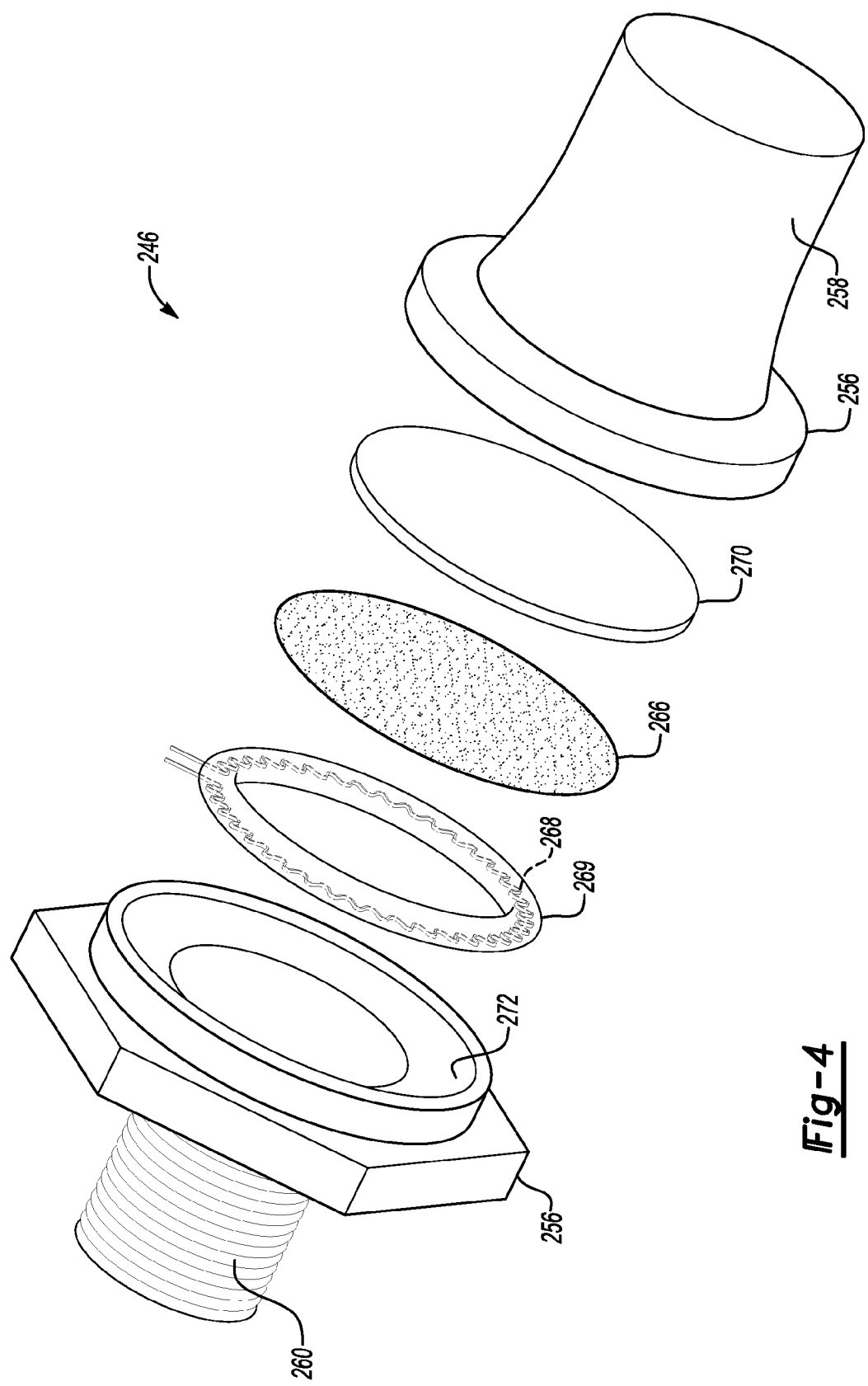
FIG. 4 is an exploded assembly view of yet another embodiment of a pressure sensor.

Referring to FIG. 4, yet another embodiment of a pressure sensor 246 includes a ring shaped heating element 268 encased within a suitable cover 269, and a two-piece housing 256. The heating element 268 sets within a cradle 272 defined by a lower portion of the housing 256. The pressure sensing element 266 and the printed circuit board 270 (and associated sensors, logic elements, and circuitry such as signal conditioning circuitry, analog to digital conversion circuitry, etc.) rest on top of the heating element 268 within the cradle 272. That is, the cover 269 associated with the heating element 268 is in contact with the sensing element 266. In other embodiments, the cover 269 may be spaced away from the sensing element 266 or rest on top of the sensing element 266 relative to the cradle 272. Additional heating elements 268 may also be disposed within the pressure sensor 246 in any suitable location.

Figure 5:
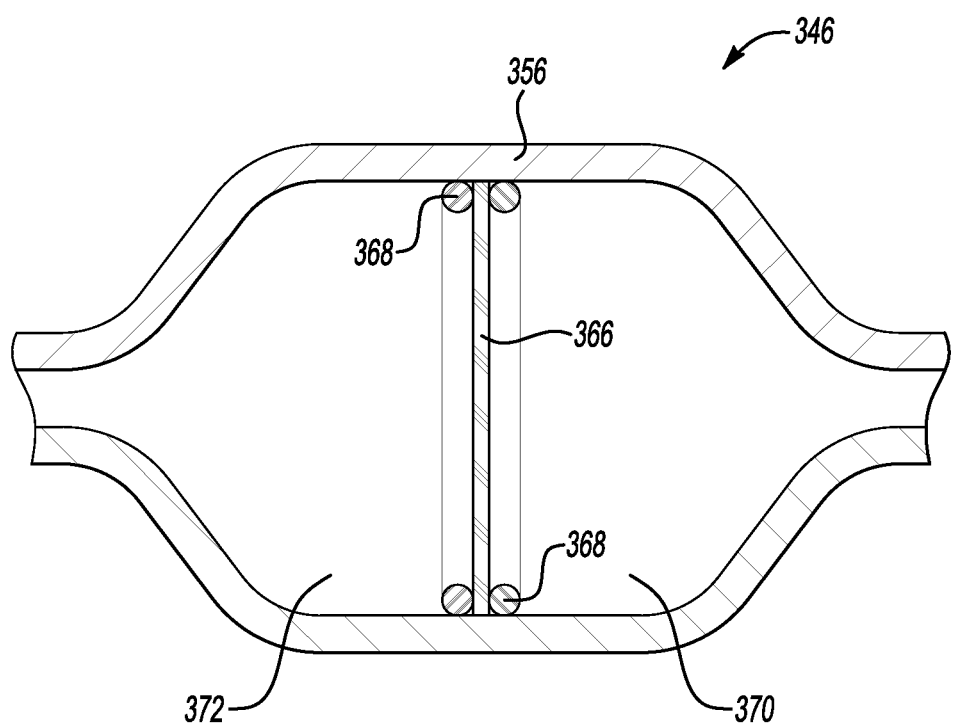
FIG. 5 is a side view, in cross-section, of still yet another embodiment of a pressure sensor.

Referring to FIG. 5, an embodiment of a differential pressure sensor 346 may include ring shaped heating elements 368 disposed on one or both of the sides of the pressure sensing element 366 (e.g., membrane). As apparent to those of ordinary skill, the pressure sensing element 366 divides the housing 356 into a low pressure side chamber 370 and a high pressure side chamber 372. The heating elements 368 are in contact with the pressure sensing element 366 in this embodiment. In other embodiments, the heating elements 368 may have a different shape and/or be spaced away from the pressure sensing element 366.

Temperature sensors, etc. may also be operatively associated with the pressure sensor 346 in a known/suitable fashion to collect data that may be used to determine when and/or if the heating elements 368 are to be activated.

While embodiments of the invention have been illustrated and described, it is not intended that these embodiments illustrate and describe all possible forms of the invention. The words used in the specification are words of description rather than of limitation, and it is understood that various changes may be made without departing from the spirit and scope of the invention.

What is claimed:

1. A fuel cell system comprising:
a fuel cell stack;
a manifold in fluid communication with the stack; and
a pressure sensor including (i) a housing defining a chamber in fluid communication with the manifold, (ii) a pressure sensing element disposed within the chamber and configured to sense a pressure within the chamber, wherein the sensing element partitions the chamber into a sense chamber and a reference chamber, and (iii) a heating element disposed within the reference chamber.

2. The system of claim 1 further comprising a layer lining at least a portion of the chamber and configured to thermally insulate the chamber from the housing.

3. The system of claim 1 wherein the housing comprises a plastic.

4. The system of claim 3 wherein the plastic is a polyphenol sulfide or polyamide.

5. The system of claim 1 wherein the heating element is in contact with the sensing element.

6. The system of claim 1 wherein the heating element is generally formed as a ring.

7. The system of claim 1 wherein the heating element is adjacent to the sensing element.

8. The system of claim 1 wherein the pressure sensor further includes an electronic circuit board and wherein the sensing element and heating element are each mounted on the circuit board.

9. The system of claim 1 wherein the pressure sensor further includes another heating element disposed in the sense chamber.

10. An automotive vehicle comprising:
a fuel cell system configured to provide motive power for the vehicle, the fuel cell system including a fuel cell stack, a manifold in fluid communication with the stack, and a pressure sensor, the pressure sensor including (i) a housing defining a chamber in fluid communication with the manifold, (ii) a pressure sensing element disposed within the chamber and configured to sense a pressure within the chamber, wherein the sensing element partitions the chamber into a high pressure side chamber and a low pressure side chamber, and (iii) a heating element disposed in one of the high pressure side and low pressure side chambers.

11. The vehicle of claim 10 wherein the pressure sensor further includes an electronic circuit board and wherein the sensing element and heating element are each mounted on the circuit board.

12. A fuel cell system comprising:
a fuel cell stack;
a manifold in fluid communication with the stack; and
a pressure sensor including (i) a housing defining a chamber in fluid communication with the manifold, (ii) a pressure sensing element disposed within the chamber and configured to sense a pressure within the chamber, wherein the sensing element partitions the chamber into a sense chamber and a reference chamber, and (iii) a heating element disposed within the sense chamber.

13. The vehicle of claim 12 wherein the heating element is in contact with the sensing element.

14. The vehicle of claim 12 wherein the heating element is generally formed as a ring.

15. The vehicle of claim 12 wherein the heating element is adjacent to the sensing element.

16. The vehicle of claim 12 wherein the pressure sensor further includes an electronic circuit board and wherein the sensing element and heating element are each mounted on the circuit board.

17. The vehicle of claim 12 wherein the pressure sensor further includes another heating element disposed in the reference chamber.

* * * * *